July 23, 1929.   E. G. CALKINS   1,721,507
CLUTCH FOR SEEDING MACHINES AND THE LIKE
Filed Sept. 13, 1926   3 Sheets-Sheet 1
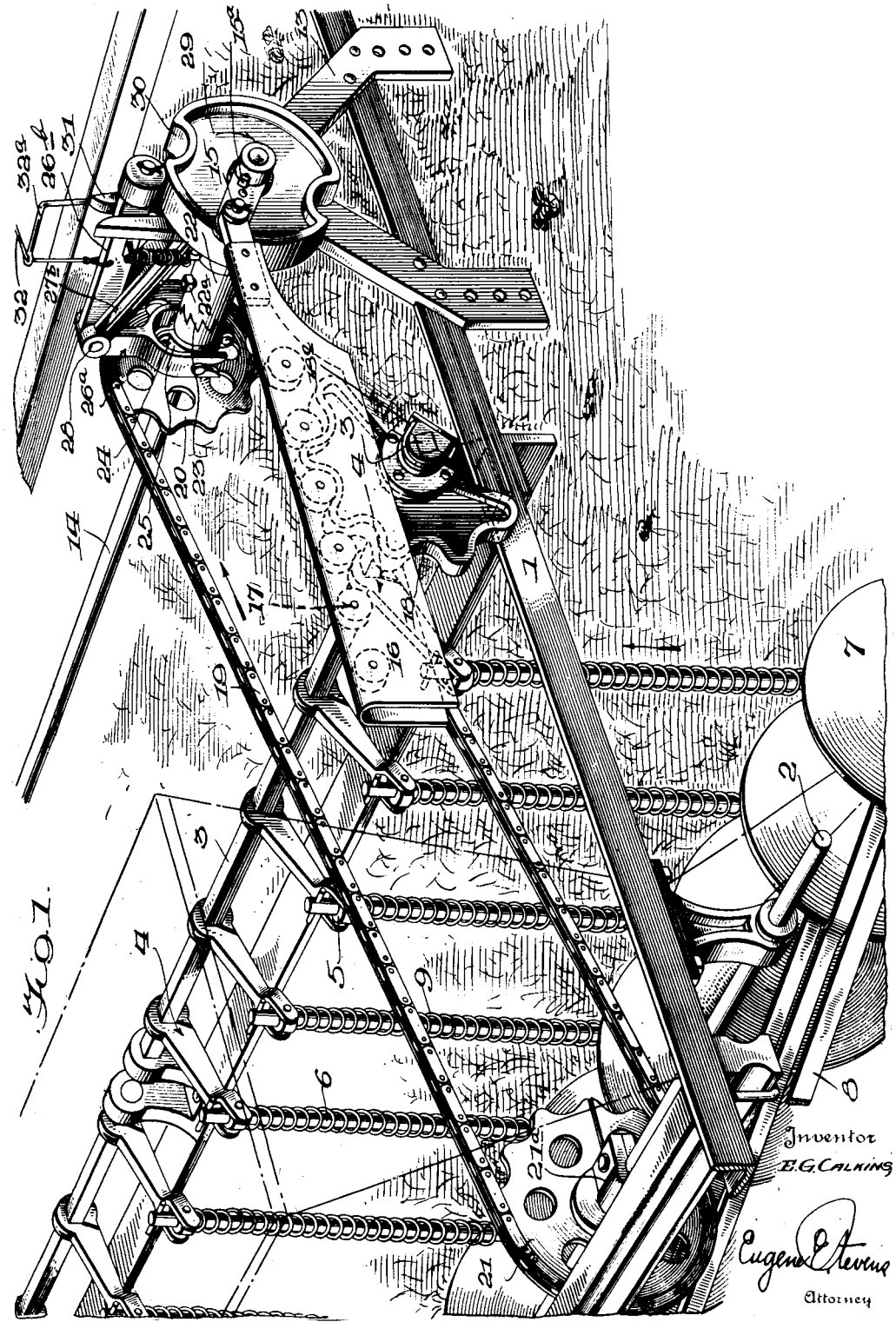

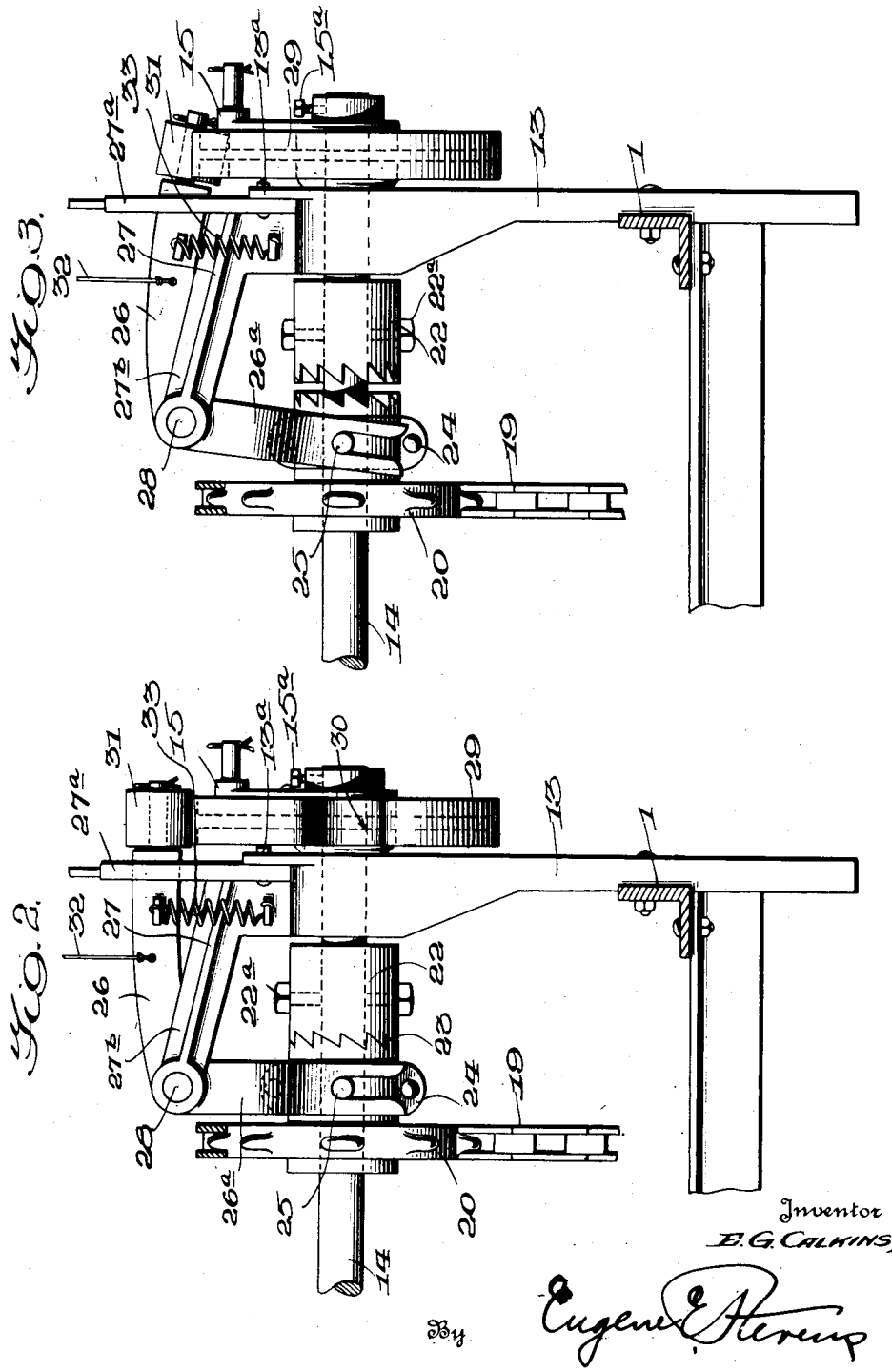

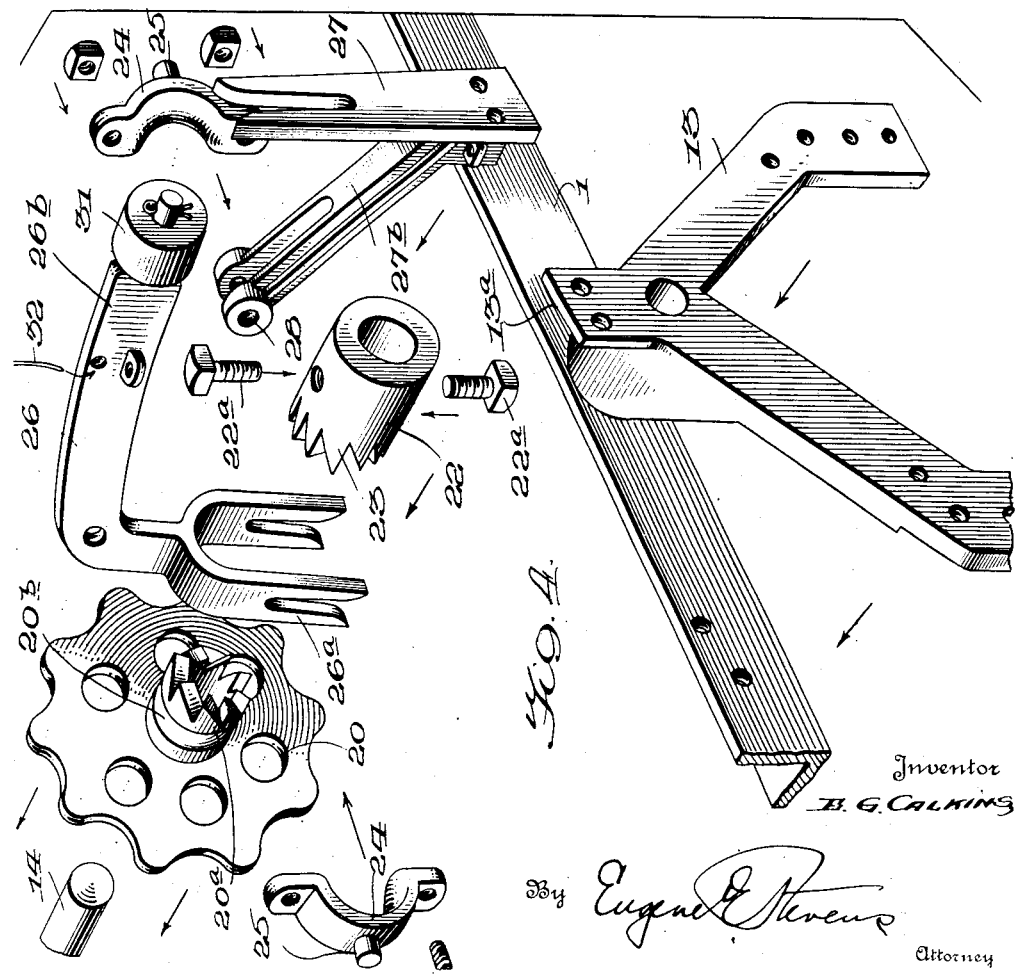

Patented July 23, 1929.

1,721,507

UNITED STATES PATENT OFFICE.

EDGAR G. CALKINS, OF MORLAND, KANSAS.

CLUTCH FOR SEEDING MACHINES AND THE LIKE.

Application filed September 13, 1926. Serial No. 135,280.

This invention relates to improvements in clutches primarily adapted for use in connection with the lifting and lowering mechanisms for the furrow openers of seeding machines and the like, it pertaining more particularly to those of the power actuated variety.

Briefly stated,—the main object of the invention is to provide a very simple and improved device of this character which is capable of ready attachment to all the common types of seeding machines without necessitating the rearrangement or modification of the normal construction thereof, and which will be operable from a distance, as for instance from the operator's seat of a tractor.

Many other objects and advantages of the invention will be developed as the description proceeds,—reference being had to the accompanying drawings which illustrate the practical application of the now preferred embodiment of the invention. I do not, of course, limit myself to the embodiment shown and described since the patent statutes entitle me to make and be protected in such modifications of or departures from the structure shown herein, as fairly fall within the spirit and scope of the invention as claimed.

In the drawings,

Figure 1 is a perspective view illustrating the application of the invention to a conventional seed drill;

Figure 2 is a rear elevation of the clutch and associated elements;

Figure 3 is a view similar to Figure 3 but showing the clutch disengaged;

Figure 4 is a group perspective view of certain parts shown in Figures 2 and 3.

Referring specifically to the drawings wherein the same characters of reference designate the same parts in all views,—numeral 1 represents the frame of a grain drill or other machine to which the mechanism is applied. The axle of the machine, which is rotatably connected with the carrying wheels is indicated by 2, and 3 indicates the usual rock shaft which carries the lifter arms 4. To the rocking cup-shaped plates 5 of the lifter arms are loosely hung the lifter rods 6 of the furrow opening disks 7, the carrier bars 8 thereof being pivotally connected at their rear ends to the rear frame bar 1. Springs 9 are coiled about the lifter rods 6 as usual, being interposed between the swinging cup-shaped plate 5 and a pin 10 inserted through one of the openings in the lower end of the rods 6.

The structure just described is a familiar one and common to practically all types of grain drills. Since the present invention relates strictly to a clutch adapted for a furrow opener lifting means, the description of the grain drill itself will be limited to such parts as are necessary to a full comprehension of the invention in hand. Here, the lifting mechanism comprehends a driven shaft 14 journalled in upstanding bearings 13, per Figure 1. A crank 15 secured to the end of shaft 14 operates rock shaft 3 through the U-shaped rack member 16 which embraces gear segment 18 and has internal rollers 17 engaging the teeth of the latter.

As will be understood from reference to Fig. 1, rotation of shaft 14 rocks the cranks 15 reciprocating the rack members 16 back and forth. This oscillates the shaft 3,—the same moving in one direction to place the furrow openers in effective position and then in the reverse direction to elevate the openers 7.

Power is supplied to shaft 14 by means of a sprocket chain 19 which is trained over a loose gear 20 on said shaft, the novel clutch structure being availed of for coupling the gear to the shaft when desired. The chain 19 is constantly driven by a gear 21 on the axle 2. For convenience in application the gear is made in two sections, bolted together as at 21ª.

The clutch will now be described. It comprehends a fixed element 22 fastened upon shaft 14 as at 22ª and provided at one edge with teeth 23 designed to engage teeth 20ª formed in the end of the hub of gear 20. Loosely mounted in a circumferential groove 20ᵇ in the hub of gear 20 is a segmental collar 24 having a pair of diametrically opposite projections 25. Through the constant engagement of the bifurcated branches of the forked end 26ª of a bell-crank lever 26 with these projections 25 the gear 20 may be held in a predetermined position and moved longitudinally on its shaft into and out of driving engagement with the clutch element 22. The bell-crank 26 is pivoted at 28 in the bifurcated end of the arm 27ᵇ of a support 27 which is bolted to one of the bearing members 13 as designated at 13ª. The arm 27ᵇ extends inwardly of the bearing member 13 and parallel with the shaft 14. Bracket 27 also has an upstanding bifurcated arm 27ª constituting a guide for arm 26ᵇ of the bell-crank on the end of which is journalled a roller 31. The roller 31 is designed to ride over the periphery of a disk 29 keyed or otherwise fastened on the end of the shaft 14 and which is also provided with two diametrically opposite notches 30 of a size to accommodate one half the periphery of the roller 31. Spring 33 serves to normally hold the roller 31 in contact with the periphery of disk 29.

The operation of the parts thus far described may be summarized as follows:

Assuming that the ground openers 7 are in the elevated position, the roller 31 is unseated from the notch 30. A simple expedient such as the cord 32 passing up over guide 32ª may be availed of for this purpose, the cord leading to the driver's seat of the tractor. The unseating of the roller 31 causes lever arm 26ª to move inwardly and carry gear 20 to driving engagement with the fixed clutch element 22. Shaft 14 now rotates and with it the disk 29. Roller 31 rides over its periphery until the second notch 30 is reached whereupon the roller drops therein rocking the bell crank to uncouple gear 20 from element 22. The shaft 14 has been rotated 180 degrees and since the radii of the cranks are at right angles to the radii of the notches 30 and the starting position of the cranks is horizontal, the racks 16 will receive a maximum of rearward throw. By adjusting the cranks 15 relatively of the disk notches the ultimate effective throw, or final position of the racks 16 when the roller falls in the next notch 30, can be varied so that the depth that the openers 7 extend into the ground can be changed to suit conditions. It is understood, of course, that the engagement of roller 31 in the second disk notch 30 will hold the openers 7 in effective position until the roller is unseated by a yank on cord 32. When this is done the shaft 14 will receive another half turn and the parts will resume their original position, the engagement of the roller 31 in the first notch holding the openers 7 elevated.

Having thus described the invention what is claimed is:

1. In a power operated lifting mechanism for seeding machines including a rotatable actuating shaft and bearings therefor, a clutch comprising a driving element loose upon said shaft, said driving element having a hub provided with a circumferential surface groove therein, a ring loosely mounted in said groove, lateral projections extending from said ring, a bell-crank lever having one arm provided with a bifurcated end embracing said ring and operatively engaging said projections, a driven element fixed to said shaft, the opposed ends of said driving and driven elements having interengageable teeth, a bracket secured to one of said shaft bearings and having a lateral arm extending above said shaft and to which said bell-crank lever is pivoted whereby said lever may be rocked to move said driving element into and out of driving engagement with said driven element, a disk fixed to said shaft and having a surface recess therein, a roller journalled upon the end of the second arm of said bell-crank lever and designed to seat in said recess to rock said lever to disengage said driving element from said driven element, said bracket having an upstanding slotted portion defining a guide for the second mentioned arm of said bell-crank lever, means associated with said second mentioned bell-crank arm and tending to hold said roller in engagement with the periphery of said disk, and manual means for rocking said bell-crank lever to disengage said roller from a disk recess whereby to operatively engage said driving and driven elements to rotate said shaft.

2. In a power operated lifting mechanism for seeding machines, a clutch comprising a driving element, said driving element having a hub provided with a circumferential surface groove therein, a ring loosely mounted in said groove, lateral projections extending from said ring, a bell-crank lever having one arm provided with a bifurcated end embracing said ring and operatively engaging said projections, a driven element, the opposed ends of said driving and driven elements having interengageable teeth, a bracket having a lateral arm to which said bell-crank lever is pivoted whereby said lever may be rocked to move said driving element into and out of driving engagement with said driven element, a disk fixed to said driven element and having a surface recess therein, a roller journalled upon the end of the second arm of said bell-crank lever and designed to seat in said recess to rock said lever to disengage said driving element from said driven element, said bracket having an upstanding guide portion for the second mentioned arm of said bell-crank lever, means associated with said second mentioned bell-crank arm and tending to hold said roller in engagement with the periphery of said disk, and manual means for rocking said bell-crank lever to disengage said roller from a disk recess whereby to operatively engage said driving and driven elements.

3. A clutch for power operated lifting mechanisms of seeding machines and the like comprising a driving element, a driven element, a bell-crank lever having one arm operatively engaging one of said driving and driven elements for operatively engaging the same, a bracket having an arm upon which said bell-crank lever is journalled, and a guide slot for the second arm of said bell-crank, a disk fixedly carried by said driven element, means tending to maintain said last mentioned bell-crank arm in engagement with the periphery of said disk, and said disk having a portion of its periphery cut away whereby said bell-crank will be rocked to disengage said driving and driven elements.

4. A clutch comprising a driving element, a driven element, a lever having an operative connection with one of said elements for operatively engaging the said elements, a bracket having a bearing in which said lever is pivoted, means carried by the other of said elements and acting upon said lever to disengage said elements after a predetermined rotation thereof, and said bracket having a guide slot remote from said bearing and in which said lever works.

5. A clutch comprising a driving element, a driven element, a lever having an operative connection with said driving element for actuating the same to engage and disengage said driven element, a bracket to which said lever is pivoted, means carried by said driven element and engaging said lever transversely of its axis to rock the same to actuate said driving element, and said bracket having a guide portion for said lever adjacent said driven element-carried means for resisting the transverse action thereof.

6. A clutch comprising a driving element, a driven element, a lever having an operative connection with said driving element for actuating the same to engage and disengage said driven element, a bracket to which said lever is pivoted, means carried by said driven element and engaging said lever transversely of its axis to rock the same to actuate said driving element, and said bracket having a guide slot in which said lever works said guide slot being remote from the pivot point of said lever and adjacent said driven element-carried means.

7. In a clutch, an actuating lever, a bracket, a lateral arm carried by said bracket to which said lever is pivoted, driven means disposed and rotatable transversely of the lever and engaging the same, and said bracket having a guide shoulder at one side of the lever transversely of the axis of the lever pivot and remote therefrom for sustaining the lever in the rotation of said driven means.

8. In a clutch, an actuating lever, a bracket, a lateral arm carried by said bracket to which said lever is pivoted, tripping means for said lever including means tending to move the lever transversely of its plane of movement, and said bracket having a guide shoulder arranged to sustain said lever against the influence of said aforementioned means.

9. In a clutch, an actuating lever, a bracket, a lateral arm carried by said bracket to which said lever is pivoted, tripping means for said lever including means tending to actuate the lever transversely of its plane of movement, and said bracket having a guide slot remote from the lever pivot and in which said lever works, said slot having its walls engaging the sides of said lever to sustain the same against the transverse action of said aforementioned means.

10. The combination set forth in claim 8,—and said transversely acting means comprising a rotatable element tangentially engaging said lever transversely of its plane of movement.

In testimony whereof I affix my signature.

EDGAR G. CALKINS.